(12) United States Patent
Freitag

(10) Patent No.: US 7,838,604 B2
(45) Date of Patent: Nov. 23, 2010

(54) METHOD FOR THE PRODUCTION OF BLOCK COPOLYCARBONATE/PHOSPHONATES AND COMPOSITIONS THEREFROM

(75) Inventor: Dieter Freitag, Chelmsford, MA (US)

(73) Assignee: FRX Polymers, Inc., Chelmsford, MA (US)

(*) Notice: Subject to any disclaimer, the term of this patent is extended or adjusted under 35 U.S.C. 154(b) by 410 days.

(21) Appl. No.: 11/563,941

(22) Filed: Nov. 28, 2006

(65) Prior Publication Data

US 2010/0130703 A1 May 27, 2010

Related U.S. Application Data

(60) Provisional application No. 60/741,124, filed on Dec. 1, 2005, provisional application No. 60/749,389, filed on Dec. 12, 2005.

(51) Int. Cl.
*C08G 79/04* (2006.01)
*C08F 283/02* (2006.01)

(52) U.S. Cl. .................. 525/538; 525/462; 525/88; 525/89; 525/94; 528/196; 528/198; 528/201; 528/202

(58) Field of Classification Search .................. 525/415, 525/468, 464, 474, 462, 88, 89, 90, 92 R, 525/92 F, 93, 94, 538; 528/196, 198, 201, 528/202
See application file for complete search history.

(56) References Cited

U.S. PATENT DOCUMENTS

| | | | |
|---|---|---|---|
| 2,435,252 A | 3/1948 | Toy | |
| 2,534,242 A | 11/1949 | Cusic | |
| 2,682,522 A | 6/1954 | Coover, Jr. et al. | |
| 2,716,101 A | 8/1955 | Coover, Jr. et al. | |
| 2,891,915 A | 6/1959 | McCormack et al. | |
| 3,153,008 A | 10/1964 | Fox | |
| 3,271,329 A | 9/1966 | Coover, Jr. et al. | |
| 3,326,852 A | 6/1967 | Thomas | |
| 3,442,854 A | 5/1969 | Curtius et al. | |
| 3,932,351 A | 1/1976 | King | |
| 3,932,566 A | 1/1976 | Reader | |
| 3,952,072 A | 4/1976 | Yonemitsu et al. | |
| 4,033,927 A | 7/1977 | Borman | |
| 4,048,106 A | 9/1977 | Hermans | |
| 4,064,107 A | 12/1977 | Stackman et al. | |
| 4,078,016 A | 3/1978 | Kramer | |
| 4,093,582 A * | 6/1978 | Mark et al. .................. 524/125 |
| 4,152,373 A | 5/1979 | Honig | |
| 4,205,162 A * | 5/1980 | Herscovici .................. 528/499 |
| 4,223,104 A * | 9/1980 | Kim et al. .................. 528/169 |
| 4,254,177 A | 3/1981 | Fulmer | |
| 4,322,520 A | 3/1982 | Schmidt et al. | |
| 4,331,614 A | 5/1982 | Schmidt et al. | |
| 4,332,921 A | 6/1982 | Schmidt et al. | |
| 4,350,793 A | 9/1982 | Schmidt et al. | |
| 4,374,971 A | 2/1983 | Schmidt et al. | |
| 4,377,537 A | 3/1983 | Block et al. | |
| 4,401,802 A | 8/1983 | Schmidt et al. | |
| 4,408,033 A | 10/1983 | Hefner, Jr. | |
| 4,474,937 A | 10/1984 | Bales | |
| 4,481,350 A | 11/1984 | Schmidt et al. | |
| 4,508,890 A | 4/1985 | Schmidt et al. | |
| 4,594,404 A | 6/1986 | Kawakami et al. | |
| 4,719,279 A | 1/1988 | Kauth et al. | |
| 4,762,905 A | 8/1988 | Schmidt et al. | |
| 4,782,123 A | 11/1988 | Kauth et al. | |
| 4,788,259 A | 11/1988 | Nielinger et al. | |
| 5,003,029 A | 3/1991 | Ueda et al. | |
| 5,034,056 A | 7/1991 | VonBonin | |
| 5,039,775 A | 8/1991 | Oyaizu | |
| 5,086,153 A | 2/1992 | Oyaizu | |
| 5,216,113 A | 6/1993 | Schulz-Schlitte et al. | |
| 5,319,058 A | 6/1994 | Hattori et al. | |
| 5,334,692 A | 8/1994 | Hess et al. | |
| 5,340,905 A * | 8/1994 | Kuhling et al. .................. 528/199 |
| 5,373,082 A * | 12/1994 | Kauth et al. .................. 528/196 |
| 5,525,681 A | 6/1996 | Barron et al. | |
| 5,639,800 A | 6/1997 | VonBonin et al. | |
| 5,652,275 A * | 7/1997 | Buysch et al. .................. 521/48 |
| 5,719,200 A | 2/1998 | Staendeke et al. | |
| 5,919,844 A | 7/1999 | Shimizu et al. | |

(Continued)

FOREIGN PATENT DOCUMENTS

EP 0077493 B1 3/1987

(Continued)

OTHER PUBLICATIONS

Lexin EXL Resin Data Sheet (Exhbit B), Sabic, 2007.*

(Continued)

*Primary Examiner*—Vasu Jagannathan
*Assistant Examiner*—Mark S Kaucher
(74) *Attorney, Agent, or Firm*—Pepper Hamilton LLP

(57) ABSTRACT

Disclosed is a new method and compositions from the method consisting of block copolycarbonate/phosphonates that exhibit an excellent combination of flame resistance, hydrolytic stability, high Tg, low melt viscosity, low color and high toughness. Also disclosed are polymer mixtures or blends comprised of these block copolycarbonate/phosphonate compositions and commodity and engineering plastics and articles produced therefrom. Further disclosed are articles of manufacture produced from these materials, such as fibers, films, coated substrates, moldings, foams, adhesives and fiber-reinforced articles, or any combination thereof.

24 Claims, No Drawings

U.S. PATENT DOCUMENTS

| | | | | |
|---|---|---|---|---|
| 6,066,700 | A | * | 5/2000 | Konig et al. ............... 525/464 |
| 6,153,212 | A | * | 11/2000 | Mao et al. ............... 424/426 |
| 6,291,630 | B1 | | 9/2001 | Konig et al. |
| 6,419,709 | B1 | * | 7/2002 | Mao et al. ............... 623/23.58 |
| 6,861,499 | B2 | | 3/2005 | Vinciguerra |
| 2002/0115793 | A1 | * | 8/2002 | Gagne et al. ............... 525/133 |
| 2002/0137874 | A1 | * | 9/2002 | Hucks et al. ............... 528/196 |
| 2004/0167284 | A1 | * | 8/2004 | Vinciguerra et al. ........ 525/132 |
| 2004/0197301 | A1 | * | 10/2004 | Zhao et al. ............... 424/78.26 |
| 2005/0020800 | A1 | * | 1/2005 | Levchik et al. ............... 528/108 |
| 2005/0222370 | A1 | | 10/2005 | Freitag et al. |
| 2006/0020104 | A1 | | 1/2006 | Freitag |

FOREIGN PATENT DOCUMENTS

| | | |
|---|---|---|
| EP | 1026191 | 8/2000 |
| GB | 2043083 | 1/1980 |
| WO | WO 99/46315 | 9/1999 |
| WO | WO 03/029258 A1 | 4/2003 |
| WO | WO 2004/076536 | 9/2004 |
| WO | WO 2004/076537 | 9/2004 |

OTHER PUBLICATIONS

Schmidt et al., Aromatische Polyphosphonate: Thermoplastische Polymere von extremer Brandwidrigeit, 1985, Die Angewandte Makromolekulare Chemie, 132(2165):1-18.

Billmeyer, Textbook of Polymer Science, $2^{nd}$ ed., Wiley Interscience, New York, 1971, pp. 45-52.

LeGrand et al., eds., Handbook of Polycarbonates, Marcel Dekker, Inc., New York, 2000 (TOC).

Levchik et al., Overview of Recent Developments in the Flame Retardancy of Polycarbonates, Polymer International, 54(7):981-998, 2005.

Cotter et al., Engineering Plastics: A Handbook of Polyarylethers, Science Publ. S.A., Switzerland 1995 (TOC).

Groggins, Unit Processes in Organic Synthesis, $4^{th}$ ed., McGraw Hill Book Co., 1952, pp. 616-620.

Morgan, Condensation Polymers, Wiley Interscience, New York, 1965, pp. 217-223.

American Society for Test Methods; Test ASTMD2863; http://www.astm.org/cgi-bin/SoftCart.exe/DATABASE.CART/REDLINE_PAGES/D2863.HTM?L+mystore+ttqw1337, 2006.

* cited by examiner

METHOD FOR THE PRODUCTION OF BLOCK COPOLYCARBONATE/PHOSPHONATES AND COMPOSITIONS THEREFROM

CROSS REFERENCES AND RELATED APPLICATIONS

The application claims priority U.S. Provisional Application No. 60/741,124 filed Dec. 1, 2005 titled "Method for the Production of Block Copolycarbonate/Phosphonates and Compositions Therefrom" and U.S. Provisional Application No. 60/749,389 filed Dec. 12, 2005 titled "Method for the Production of Block Copolycarbonate/Phosphonates and Compositions Therefrom", the contents of both are incorporated herein by reference.

BACKGROUND

Polycarbonates (PCs) are outstanding engineering thermoplastics that have an excellent combination of properties, such as high heat distortion temperatures, low color, transparency, melt processability and outstanding toughness. These materials are used in a wide variety of applications and are produced on an enormous scale commercially. However, polycarbonates lack flame resistance, and there is a demand and need for flame resistant polycarbonates. A variety of approaches have been undertaken to impart flame resistance to these materials, but these approaches have been unsuccessful largely because flame resistant PCs lose a lot of the advantageous properties that polycarbonates inherently possess.

Polyphosphonates are known to exhibit excellent fire resistance (see for example, U.S. Pat. Nos. 2,682,522, 2,891,915 and 4,331,614). Thus, it would seem reasonable to combine polycarbonates and polyphosphonates in an attempt to combine their attributes to produce a material with the physical properties of polycarbonates and the added feature of flame resistance. However, the realization of this combination's properties by combining polycarbonates and polyphosphonates has proven to be extremely difficult.

The synthesis of random copolycarbonate/phosphonates by condensing a carbonate precursor, an aryl phosphonic acid dichloride and an aromatic diol in as halogenated solvent such as methylene chloride is described in U.S. Pat. No. 4,223,104. Using this process, random copolycarbonate/phosphonates are isolated from a solution by precipitation into methanol or by evaporation of the solvent. However, this method gives completely random copolycarbonate/phosphonates, uses expensive monomers (aryl phosphonic acid dichloride), and undesirable halogenated solvents.

In a similar manner, random copolycarbonate/phosphonates have been synthesized from the reaction of a diaryl carbonate, an aromatic bisphenol and a phosphonic acid diaryl ester in a melt condensation reaction using a basic catalyst, and in some cases a branching agent as described in U.S. Pat. Nos. 4,322,520, 4,401,802, 4,481,350, 4,508,890, 4,762,905. This synthetic method also gives completely random copolycarbonate/phosphonates that do not exhibit an acceptable combination of properties. Most notably, these random copolycarbonate/phosphonates lack toughness, and their heat distortion temperature is significantly reduced below that of polycarbonate.

U.S. Pat. No. 4,719,279 described another process wherein oligophosphonates with phenolic endgroups are first synthesized via the reaction of a phosphonic acid diaryl ester with an excess of an aromatic bisphenol using a basic catalyst. This oligomer is subsequently reacted in a phase boundary process with an aromatic dicarboxylic acid dichloride or phosgene, or a mixture of both, to give a product with less than 0.01% phenolic content by weight. This method is somewhat complex and requires the use of halogenated solvents that are environmentally unacceptable. Moreover, the resultant materials do not exhibit a favorable combination of properties with regard to toughness and other mechanical properties.

Another method, as described in U.S. Pat. No. 4,782,123, involves the preparation of copolycarboxylate/carbonate/phosphonates by the extrusion of a mixture of an aromatic polyester, a polycarbonate, and an aromatic polyphosphonate in a solvent at temperatures ranging from 150 to 420°. However, this approach also utilizes halogenated solvents that are environmentally unacceptable.

U.S. Pat. No. 4,332,921 described methods that attempt to combine the attributes of polycarbonates and polyphosphonates by making physical blends of the two via melt mixing. This method gives a physical blend of a polycarbonate and a polyphosphonate with 2 different distinct glass transition temperatures, one for PC and one for polyphosphonate. This blend is likely to be unstable under various thermal conditions and mechanical loads leading to subsequent phase segregation and consequent changes in properties.

Attempts have been made to add flame resistance to the properties of polycarbonates through the use of phosphorus containing additives, monomers, and polymers. However, none have been successful in producing a material that could be prepared in a simple and facile manner at an acceptable cost and having an acceptable combination of physical and mechanical properties.

In view of the above, there is a need for a simple, facile, cost effective method to produce copolycarbonate/phosphonates that exhibit a favorable combination of physical and mechanical properties. Therefore a method to produce such materials is disclosed in the instant invention. The compositions are comprised of block copolycarbonate/phosphonates that exhibit significant improvements in flame resistance relative to polycarbonate, with minimal sacrifice to the properties of polycarbonates such as high heat distortion temperature, low color, high toughness, hydrolytical stability, and high glass transition temperature (Tg). Further, the block copolycarbonate/phosphonates of the present invention exhibit higher Tgs, superior heat distortion temperatures, and toughness as compared to random copolycarbonate/phosphonates.

BRIEF SUMMARY

The invention presented herein generally includes a method of preparing block copolycarbonate/phosphonates comprising, obtaining a predominately phenol terminated oligocarbonate, and optionally free bisphenol, in a first step; and reacting the predominately phenol terminated oligocarbonate, and optionally free bisphenol, with an alkylphosphonic acid diarylester at an elevated temperature under reduced pressure in a melt to make a block copolycarbonate/phosphonate in a second step. The method may also include performing the second step under elevated temperature and reduced pressure such that volatile components are removed.

In some embodiments, the method may further include reacting a polycarbonate with a phenolic compound under conditions such that the phenolic compound is refluxing but is not removed to obtain the predominately phenol terminated oligocarbonate and optionally free bisphenol. The phenolic compound, of certain embodiments, may phenol, and the phenolic compound may, generally, be provided at a molar ratio of about 0.1 to about 5 of the polycarbonate. In other embodiments, the step of reacting the polycarbonate with the phenolic compound may occur in the presence of the alkylphosphonic acid diarylester.

In other embodiments, the method may further include reacting diphenyl carbonate, a molar excess of a bisphenol which may be about 1.2 to about 6, and a transesterification catalyst at elevated temperature under reduced pressure in a melt to obtain the predominately phenol terminated oligocarbonate and optionally free bisphenol. The bisphenol of certain embodiments may be 2,2-bis(4-hydroxyphenyl)propane.

In embodiments, the alkylphosphonic acid diarylester may be methylphosphonic acid diphenylester and may be provided at a molar ratio of from about 0.1 to about 5 of the predominately phenol terminated oligocarbonate.

Some embodiments may include providing a transesterification catalyst, and the transesterification catalyst may be sodium phenolate, tetraphenylphosphonium phenolate, or combinations thereof. In embodiments, the transesterification catalyst may be provided to prior to the step of reacting, and in other embodiments, the transesterification catalyst may be provided during the step of reacting.

The predominately phenol terminated oligocarbonate may be linear oligocarbonate, branched oligocarbonate, and combinations thereof, in some embodiments. In other embodiments, the predominately phenol terminated oligocarbonate may have a relative viscosity ($\eta_{rel}$) of from about 1.02 to about 1.18.

In embodiments, the elevated temperature and reduced pressure may be maintained from about 0.5 to about 24 hours, and in certain embodiments, the method may include the step of heating a mixture resulting from the second step to a temperature of from about 250° C. to about 310° C. for from about 0.5 to about 10 hours.

The block copolycarbonate/phosphonate produced may be from about 0.1% to about 10% by weight phosphorus and, in sonic embodiments may be from about 0.1 to about 5% by weight phosphorus is present in the block copolycarbonate/phosphonate.

The invention also include a method for preparing block copolycarbonate/phosphonate including reacting a polycarbonate, a phenolic compound, and an alkylphosphonic acid diaryl ester in a first step under conditions such that the phenolic compound is refluxing but is not removed for a first time period, and reacting a mixture resulting from the first step at elevated temperature under reduced pressure such that volatile compounds are removed for a second time period to make the block copolycarbonate/phosphonate in a second step. An oligocarbonate may, generally, be formed in the first step. In some embodiments, the phenolic compound may be phenol, and in others, the alkylphosphonic acid diaryl ester is methylphosphonic acid diphenylester.

The invention further related to a block copolycarbonate/phosphonates prepared by a method including obtaining a predominately phenol terminated oligocarbonate and optionally free bisphenol in a first step, and reacting the predominately phenol terminated oligocarbonate and optionally free bisphenol with an alkylphosphonic acid diarylester at an elevated temperature under reduced pressure in a melt to make a block copolycarbonate/phosphonate in a second step. In embodiments, the elevated temperature and reduced pressure of the second step may be such that volatile components are removed.

In some embodiments, the method may further include reacting a diphenyl carbonate with a molar excess of bisphenol to obtain the oligocarbonate and optionally free bisphenol, and the step of reacting the diphenyl carbonate with a molar excess of bisphenol may occur at an elevated temperature and reduced pressure.

Other aspects of the invention include a block copolycarbonate/phosphonates prepared by a method including reacting diphenyl carbonate and a molar excess of bisphenol to obtain a predominately phenol terminated oligocarbonate and optionally free bisphenol in a first step, and reacting the predominately phenol terminated oligocarbonate and optionally free bisphenol with an alkylphosphonic acid diaryl ester at an elevated temperature under reduced pressure in a melt to make a block copolycarbonate/phosphonate in a second step. In some embodiments, the first step may occur at an elevated temperature under reduced pressure.

Still other embodiments of the invention include a block copolycarbonate/phosphonates prepared by a method including reacting a polycarbonate, phenolic compound, and an alkylphosphonic acid diaryl ester under conditions such that the phenolic compound is refluxing but is not removed for a first time period in a first step, and reacting a mixture resulting from the first step at an elevated temperature under reduced pressure such that volatile compounds are removed for a second time period to make the block copolycarbonate/phosphonate in a second step.

Another aspect of the invention includes as polymer blend or mixture including at least one block copolycarbonate/phosphonate prepared by a method including obtaining a predominately phenol terminated oligocarbonate and optionally free bisphenol in a first step, and reacting the predominately phenol terminated oligocarbonate with an alkylphosphonic acid diarylester at an elevated temperature under reduced pressure in a melt to make a block copolycarbonate/phosphonate in a second step, and at least one other polymer to make a polymer blend or mixture. In some embodiments, the step of obtaining a predominately phenol terminated oligocarbonate and optionally free bisphenol may include reacting a polycarbonate with a phenolic compound under conditions such that the phenolic compound is refluxing but is not removed to obtain the predominately phenol terminated oligocarbonate and optionally free bisphenol. In other embodiments, the step of obtaining a predominately phenol terminated oligocarbonate and optionally free bisphenol comprises reacting diphenyl carbonate, a molar excess of a bisphenol, and a transesterification catalyst at elevated temperature under reduced pressure in a melt to obtain the predominately phenol terminated oligocarbonate and optionally free bisphenol. In certain embodiments, the other polymer is selected from polycarbonates, polyacrylates, polyacrylonitriles, saturated and unsaturated polyesters, polyamides, polystyrenes, high impact polystyrenes, polyurethanes, polyureas, polyepoxides, poly(acrylonitrile butadiene polyintides, polyarylates, poly(arylene ether)s, polyethylenes, polypropylenes, polyphenylene sulfides, poly(vinyl ester)s, polyvinyl chlorides, bismaleimide polymers, polyanhydrides, liquid crystalline polymers, polyethers, polyphenylene oxides, cellulose polymers, and combination thereof.

DESCRIPTION OF DRAWINGS

Not Applicable

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "polycarbonate" is a reference to one or more polycarbonates and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. Nothing herein is to be construed as an admission that the invention is not entitled to antedate such disclosure by virtue of prior invention.

As used herein, the term "about" means plus or minus 10% of the numerical value of the number with which it is being used. Therefore, about 50% means in the range of 45%-55%.

"Optional" or "optionally" means that the subsequently described event or circumstance may or may not occur, and that the description includes instances where the event occurs and instances where it does not.

The term "alkyl" or "alkyl group" refers to a branched or unbranched hydrocarbon or group of 1 to 20 carbon atoms, such as but not limited to methyl, ethyl, n-propyl, isopropyl, n-butyl, isobutyl, t-butyl, octyl, decyl, tetradecyl, hexadecyl, eicosyl, tetracosyl and the like. "Cycloalkyl" or "cycloalkyl groups" are branched or unbranched hydrocarbons in which all or some of the carbons are arranged in a ring such as but not limited to cyclopentyl, cyclohexyl, methylcyclohexyl and the like. The term "lower alkyl" includes an alkyl group of 1 to 10 carbon atoms.

The term "aryl" or "aryl group" refers to monovalent aromatic hydrocarbon radicals or groups consisting of one or more fused rings in which at least one ring is aromatic in nature. Aryls may include but are not limited to phenyl, napthyl, biphenyl ring systems and the like. The aryl group may be unsubstituted or substituted with a variety of substituents including but not limited to alkyl, alkenyl, halide, benzylic, alkyl or aromatic ether, nitro, cyano and the like and combinations thereof.

"Substituent" refers to a molecular group that replaces a hydrogen in a compound and may include but is not limited to trifluoromethyl, nitro, cyano, $C_1$-$C_{20}$ alkyl, aromatic or aryl, halide (F, Cl, Br, I), $C_1$-$C_{20}$ alkyl ether, benzyl halide, benzyl ether, aromatic or aryl ether, hydroxy, alkoxy, amino alkylamino (—NHR') dialkylamino (—NR'R") or other groups which do not interfere with the formation of the diaryl alkylphosphonate.

As defined herein, an "arylol" or an "arylol group" is an aryl group with a hydroxyl, OH, group substituent on the aryl ring. Non-limiting examples of arylols are phenol, naphthalene and the like. A wide variety of arylols may be used in the embodiments of the invention and are commercially available.

The term "alkanol" or "alkanol group" refers to a compound comprising an alkyl of 1 to 20 carbon atoms or more having at least one hydroxyl group substituent. Examples of alkanols include but are not limited to methanol, ethanol, 1- and 2-propanol, dimethylethanol, hexanol, octanol and the like. Alkanol groups may be optionally substituted with substituents as described above.

The term "alkenol" or "alkenol group" refers to a compound comprising an alkene 2 to 20 carbon atoms or more having at least one hydroxyl group substituent. The hydroxyl may be arranged in either isomeric configuration (cis or trans). Alkenols may be further substituted with one or more substituents as described above and may be used in place of alkanols in some embodiments of the invention. Alkenols are known to those skilled in the art and many are readily available commercially.

The terms "flame retardant", "flame resistant", "fire resistant" or "fire resistance", as used herein, mean that the composition exhibits a limiting oxygen index (LOI) of at least 27.

"Molecular weight", as used herein, is determined by relative viscosity ($\eta_{rel}$) and/or gel permeation chromatography (GPC). "Relative viscosity" of a polymer is measured by dissolving a known quantity of polymer in to solvent and comparing the time it takes for this solution and the neat solvent to travel through a specially designed capillary (viscometer) at a constant temperature. Relative viscosity is a measurement that is indicative of the molecular weight of a polymer, it is also well known that a reduction in relative viscosity is indicative of a reduction in molecular weight, and reduction in molecular weight causes loss of mechanical properties such as strength and toughness. GPC provides information about the molecular weight and molecular weight distribution of a polymer. It is known that the molecular weight distribution of a polymer is important to properties such as thermo-oxidative stability (due to different amount of end groups), toughness, melt flow, and fire resistance, for example, low molecular weight polymers drip more when burned.

The term "toughness", as used herein, is determined qualitatively on a film or a molded specimen.

Unless otherwise stated, the term "tetraphenylphosphonium phenolate" as used herein is meant to describe the chemical complex of about 70% tetraphenylphosphonium phenolate and about 30% phenol. The melting point of this complex is typically about 145° C.

The term "predominately phenol terminated oligocarbonates" is meat to describe carbonate oligomers having at least about 20% phenolic end groups and, more preferably, at least about 50% phenolic end groups.

Embodiments of the invention presented herein may pertain to a method for producing block copolycarbonate/phosphonates, block copolycarbonate/phosphonates prepared by this method, and compositions related to the method. Block copolycarbonate/phosphonates prepared by the method presented herein may have an advantageous combination of properties, including, for example, fire resistance, melt processability, high toughness, high Tg, high heat distortion temperatures, hydrolytic stability, and low color. The compositions produced from methods of embodiments may include block copolycarbonate/phosphonates that may contain from about 0.1% to about 10% phosphorus by weight in some embodiments and from about 1% to 5% by weight in others.

In embodiments, block copolycarbonate/phosphonates may be prepared from a predominately phenol terminated linear or branched oligocarbonate, and optionally free bisphenol, an ally acid diaryl ester and a transesterification catalyst in a melt using a method that may include at least two steps and an optional third step. A first step may involve the preparation of a predominately phenol terminated branched or linear oligocarbonate which may or may not contain free bisphenol. In a second step, the predominately phenol terminated oligocarbonate, and optionally free bisphenol, may be reacted with an alkylphosphonic acid diarylester, and optionally a transesterification catalyst and/or a branching agent such as, for example, triphenol or triphenylphosphate, in a melt. An optional third step may include heating the reaction mixture obtained after the first two steps have been completed under temperature and reduced pressure such that all volatile components are removed.

In sonic embodiments, the first step may include the preparation of a predominately phenol terminated linear oligocarbonate, and optionally free bisphenol, by reacting diphenyl carbonate with a molar excess of an aromatic bisphenol and a transesterification catalyst in a melt. In other embodiments, a predominately phenol terminated branched oligocarbonate which may or may not contain free bisphenol may be prepared in the first step by reacting diphenyl carbonate with a molar excess of an aromatic bisphenol, a branching agent, and a transesterification catalyst in a melt. The first step may be conducted under a combination of temperature and reduced pressure such that phenol may be distilled from the reaction mixture and diphenyl carbonate may be retained in the reaction mixture and may continue for a period of time from about 0.5 to about 24 hours. In certain embodiments, the predominately phenol terminated oligocarbonate may optionally be isolated before proceeding to the second step. However, the step of isolating the oligocarbonate is not necessary; therefore, the method may be conducted in a continuous manner in a single reaction vessel in a one-pot synthesis.

In embodiments wherein the first step includes reacting diphenyl carbonate with a molar excess of an aromatic bisphenol, the relative molar ratio of the aromatic bisphenol to the diphenyl carbonate may range from about 1.2 to about 1, and in some embodiments, the molar ratio of aromatic bisphenol to the diphenyl carbonate may be from about 6 to about 1.

In embodiments, the second step may include the addition of an alkylphosphonic acid diarylester to a mixture resulting from the first step wherein oligocarbonates are synthesized and may be carried out under a combination of temperature and reduced pressure such that phenol is distilled from the reaction mixture while the alkylphosphonic acid diarylester may be retained in the reaction mixture as, during the second step, the oligocarbonates, and optionally free bisphenol, produced in the first step may react with the alkylphosphonic acid diarylester to produce a block copolycarbonate/phosphonate. In some embodiments a distillation column may be used to facilitate the removal of phenol from the reaction mixture without removing the alkylphosphonic acid diarylester, in embodiments, the second step may continue for a period of time ranging from about 0.5 to about 24 hours, and in others, the period of time may range from about 0.5 to 10 hours. The reaction temperature for the second step of embodiments may range from about 250° C. to about 310° C.

In other embodiments, the first step may include the preparation of oligocarbonates, and optionally free bisphenol, by reacting a branched or linear polycarbonate with an aromatic alcohol, such as, for example, phenol or substituted phenol and, optionally, in the presence of an alkylphosphonic acid diarylester and, optionally, a transesterification catalyst in a melt. In certain embodiments, oligocarbonates may be prepared from a reaction mixture having branched or linear polycarbonates, an aromatic alcohol, an alkylphosphonic acid diarylester, and optionally, a transesterification catalyst. The reaction of embodiments may be conducted under conditions of temperature and pressure such that the phenolic compound refluxes, but is not removed from the reaction mixture. For example in some embodiments, the reaction vessel may be fined with a condenser to prevent the phenolic compound from being distilled out during the first step. In such embodiments, these reaction conditions may be maintained for from about 0.5 to about 24 hours. Without wishing to be bound by theory, the aromatic alcohol may react with the polycarbonate and may cleave the polycarbonate into smaller fragments producing, predominately phenol terminated oligocarbonates that may be utilized in a second step to produce block copolycarbonate/phosphonates.

In embodiments wherein the first step includes combining a branched or linear polycarbonate with an aromatic alcohol, the relative molar ratio of the phenolic compound to the polycarbonate may range from about 0.001 to about 10, and in some embodiments, the molar ratio of polycarbonate to aromatic alcohol may be from about 0.1 to about 5. The molar ratio of alkylphosphonic acid diarylester to branched or linear polycarbonate may be from about 0.01 to about 10 in some embodiments, and from about 0.1 to about 5 in others.

The second step of embodiments including a first step in which oligocarbonates, and optionally free bisphenol, are prepared from polycarbonates may include reducing the pressure of the reaction, such that the phenolic compound may be distilled away from the reaction mixture without removing the alkylphosphonic acid diarylester, and in some embodiments, this may require replacing a condenser on a reactor with a distillation column. The oligocarbonates, and optionally free bisphenol, prepared in the first step may react with the alkylphosphonic acid diarylester of the reaction mixture to produce a block copolycarbonate/phosphonate. In such embodiments, a transesterification catalyst may be included in the reaction mixture in either or both of the first and second steps. The second step of embodiments may continue for a period of time ranging from about 0.5 to about 24 hours, and in other embodiments, the period of time may range from about 0.5 to 10 hours. In embodiments, the reaction temperature for the second step may range from about 250° C. to about 310° C.

Certain embodiments of the method described hereinabove may include an optional third step wherein a reaction mixture resulting from the second step may be heated to a temperature of from about 250° C. to about 310° C. under reduced pressure such that all volatile components such as, for example, phenol, alkylphosphonic acid diarylester, and the like are removed. In such embodiments, the third step may continue for a period of from about 0.5 to about 10 hours, and a transesterification catalyst may optionally be added to the reaction mixture before or during the heating process of the optional third step. In embodiments where a distillation column has been utilized during the second step, the third step may include the removal of the distillation column to facilitate the removal of volatile components, and in certain embodiments, the third step may be repeated (i.e. conducted more than once) to assure complete removal of volatiles.

As described above, the method of embodiments may be conducted in a one pot synthesis, wherein first the oligocarbonate, and optionally free bisphenol, may be prepared either from carbonate monomers or from polycarbonates, and the alkylphosphonic acid diarylester, and optionally a transesterification catalyst may be subsequently added to as reaction mixture resulting from the preparation of oligocarbonates, and optionally free bisphenol, in the same reactor, and reaction conditions in the reactor may be altered to stimulate the reaction of the alkylphosphonic acid diarylester with the oligocarbonates. In other embodiments, the alkylphosphonic acid diarylester and optionally a transesterification catalyst may already be present in the reaction mixture resulting from the preparation of oligocarbonates, and in such cases, reaction conditions in the reactor may be changed to facilitate the reaction of the alkylphosphonic acid diarylester with the oligocarbonates. In still other embodiments, the optional third step ma also be conducted in the same reactor or the reaction conditions in the reactor may be changed to facilitate the third step.

Either commercial or custom synthesized branched or linear polycarbonates may be suitable for use in embodiments of the method described herein. In some embodiments the polycarbonates may have a relative viscosity ($\eta_{rel}$) of at least about 1.2 or from about 1.02 to about 1.18 in certain embodiments. Non-limiting examples of commercially available polycarbonates may be those available under the trade names Lexan (General Electric Company), Makrolon (Bayer AG), Apec (Bayer AG), Hiloy (ComAlloy), Calibre (Dow Chemical Co.), Lupilonx (Mitsubishi), Naxell (MRC Polymers), Edgetek (PolyOne), Trirex (Kasei) and Panlite (Teijin Chemicals). It should be understood that any polycarbonate available now or in the future may be used in embodiments of the method presented herein.

Custom polycarbonates may be prepared by any method known in the art. For example, custom polycarbonates may be synthesized from diphenyl carbonate and any known bisphenol using a transesterification catalyst, and in the case of branched polycarbonates, a branching agent, or by an interfacial polycondensation process using phosgene and any bisphenol with or without a branching agent. A variety of bisphenols can be used in such reactions, and a compilation of known bisphenols readily available and well known to those skilled in the art including those containing heterocyclic structures can be found in "Engineering Plastics: A Handbook of Polyarylethers" by Robert J. Cotter, Gordon and Breach Science Publishers S. A., Switzerland 1995. For example, bisphenols may include, but are not limited to, resorcinol, hydroquinone, 4,4'-biphenol, 2,2-bis(4-hydroxyphenyl)propane (bisphenol A), 3,3'-biphenol, 4,4'-dihydroxyphenyl ether, 4,4'-dihydroxydiphenylsulfone, 9,9-dihydroxyphenyl fluorine, 1,1-bis(4-hydroxyphenyl)-3,3-dimethyl-5-methylcyclohexane, 4,4'-dihydroxybenzophenone, 4,4'-dihydroxyphenyl sulfide, 1-methyl-1-phenyl bis(4-hydroxyphenyl)methane, bis(3-hydroxyphenyl)methane, bis(4-hydroxyphenyl)methane, 9,9-bis(3-methyl-4-hydroxyphenyl)fluorene, 9,9-bis(3,5-dimethyl-4-hydroxyphenyl)fluorine, 1,4-bis[(4-hydroxyphenyl)-2-propyl]benzene, 1,4-bis[(4-hydroxyphenyl)-3,5 dimethylphenyl]-2-propyl]benzene, 4,4'-bis(4-hydroxyphenyl)diphenyl methane, 2,2-bis(4-hydroxyphenyl)hexafluoroisopropylidene, 1-trifluoromethyl-1-phenyl bis(4-hydroxyphenyl)methane and combinations thereof.

In some embodiments, predominately phenol terminated oligocarbonate may be available, for example, commercially or custom synthesized. In such cases, the first step may be omitted, and the method ma be started with the second step. For example, a manufactured predominately phenol terminated oligocarbonate may be placed in a reaction vessel with alkylphosphonic acid diarylester, and optionally a transesterification catalyst and/or a branching agent, and the method may begin at the second step. In particular, the reaction may be conducted under a combination of temperature and reduced pressure such that phenol is being distilled from the reaction mixture while the unreacted alkylphosphonic acid diarylester remains in the reaction mixture for a period of time ranging from about 0.5 to about 24 hours, and the alkylphosphonic acid diarylester may react with the predominately phenol terminated oligocarbonate to produce block copolycarbonate/phosphonates.

The method of embodiments may use a variety of alkylphosphonic acid diarylesters, such as, for example, those of general formula I;

wherein $R_1$ is represented by general formula (II);

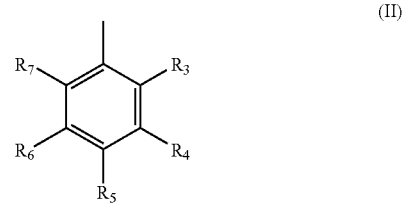

wherein $R_3$, $R_4$, $R_5$, $R_6$, and $R_7$ represent any combination, of the following radicals: hydrogen, trifluoromethyl, nitro, cyano, $C_1$-$C_{20}$ alkyl, aromatic, halide, $C_1$-$C_{20}$ alkyl ether, benzyl benzyl ether, and aromatic ether, and wherein $R_2$ represents an alkyl radical having a carbon chain ranging from 1 to 20 arranged in a variety of isomeric configurations. In certain embodiments, the alkylphosphonic acid diarylester may be methylphosphonic acid diphenylester (See formula III).

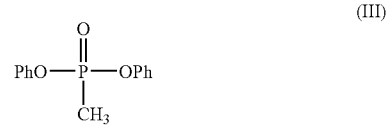

In embodiments including a phenolic compound, a variety of commercially available or custom synthesized phenolic compounds may be used. For example, a phenolic compound may be of general formula IV:

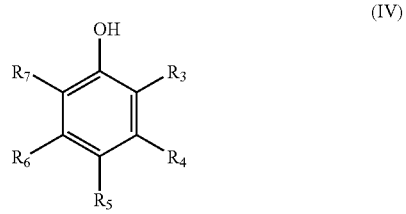

wherein $R_3$, $R_4$, $R_6$, and $R_7$ represent any combination of the following radicals; hydrogen, trifluoromethyl, nitro, cyano, $C_1$-$C_{20}$ alkyl, aromatic, halide, $C_1$-$C_{20}$ alkyl ether, benzyl halide, benzyl ether, and aromatic ether. In certain embodiments, the phenolic compound may be phenol wherein $R_3$, $R_4$, $R_5$, $R_6$ and $R_7$ represent hydrogen radicals.

The transesterification catalyst of embodiments may be any transesterification catalyst known in the art and used for polycarbonate synthesis. In embodiments, the catalysts are added in the first step, in the second step, and optionally in the third step, or in any combination of these steps, and the transesterification catalysts used may be the same for each step or may be different. For example, the transesterification catalysts used may be any of those discussed in "Unit Processes in Organic Synthesis", Groggins, 4$^{th}$ Edition, McGraw Hill Book Co., 1952, pages 616-620, or U.S. Pat. Nos. 3,153,008 and 3,442,854, and in certain embodiments, the transesterification catalysts may include, but is not limited to, sodium phenolate, sodium bisphenolate, quarternary phosphonium, and aqueous-based phenol quarternary phosphonium catalysts and combinations and mixtures thereof. For example, quarternary phosphonium catalysts may be those represented in general formula V.

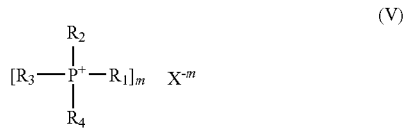

wherein $R_1$-$R_4$ are each independently phenyl, benzyl, alkyl or inertly-substituted alkyl having 1-12 carbon atoms, and in some embodiments, $R_1$-$R_4$ may each be benzyl, phenyl or $C_1$-$C_4$ alkyl, or $R_1$-$R_3$ may each be phenyl and $R_4$ may be a $C_1$-$C_4$ alkyl or benzyl. X may be a conjugate base of an aromatic carbocyclic compound and may bear at least one nuclear hydroxyl group, and m may be the valence of the anion X. In some embodiments, anions may include diphenylphosphate, tetraaryl borohydride, a halide, and the like, or a substituted or unsubstituted phenolate group. In certain embodiments, tetrahydrocarbylphosphonium phenoxide compounds may be complexed with one or more equivalents of a carboxylic hydroxyl compound, $H_mX$, wherein X and m are defined above. Tetraphenylphosphonium phenolate may exist as a complex of about 70% tetraphenylphosphonium phenolate and about 30% phenol in some embodiments and may be the catalyst used in the third step in other embodiments. These quarternary phosphonium catalysts may be added to the reaction mixture as a solid or, alternatively, may be dissolved in a solvent such as alcohol, water or alcohol/water mixtures. In certain embodiments, the catalyst may be sodium phenolate and tetraphenylphosphonium phenolate.

Any branching agent known in the art may be used in the synthesis of the branched predominately phenol terminated oligocarbonates in embodiments, such as, for example, the branching agent may be 1,1,1-tris(4-hydroxyphenyl)ethane.

The reaction time and temperature may vary between embodiments of the method and within steps of the embodiments. In some embodiments during a first step involving synthesis of the predominately phenol terminated branched and linear oligocarbonates from diphenyl carbonate with a molar excess of an aromatic bisphenol, the reaction time at which reflux occurs while phenol is being, removed from the reaction mixture can range from about 0.5 to 24 hours in some embodiments and 1 to 8 hours in others. In other embodiments during a first step involving reacting polycarbonates with at least one phenolic compound to prepare oligocarbonates, the reaction time at which reflux occurs while the phenolic compound remains in the reaction mixture may range from about 0.5 to about 24 hours in some embodiments, and from about 1 to about 8 hours in others. For the second step, the reaction time at which reflux occurs while phenol is removed from the reaction mixture may range from about 0.5 to 24 hours, in embodiments, and 1 to 8 hours, in others. A time period for an optional third step may range from about 0.5 to about 10 hours. For the overall method (steps 1-3 combined), the temperature may range from about 200° C. to about 310° C., and in embodiments, the vacuum may range from about 10 mm to about 0.001 mm Hg, or in other embodiments, the vacuum may be adjusted during the course of the reaction from just below 760 mm to about 0.001 mm Hg.

The temperature and vacuum under which the reaction takes place may be adjusted during the course of the method to stimulate various steps and during each individual step to achieve maximum efficiency. For example, during the first step, the temperature and vacuum may be adjusted to provide the proper reflux conditions enabling removal of phenol while keeping the diphenyl carbonate in the reaction mixture during the production of oligocarbonates, in some embodiments, or the temperature and vacuum may be adjusted to provide reflux without the removal of phenol while oligocarbonates are produced from polycarbonates, in other embodiments. During the second step, the temperature and vacuum may be adjusted to provide conditions that enable the removal of phenol while keeping the alkylphosphonic acid diarylester in the reaction mixture while block copolycarbonate/phosphonates are produced, and the temperature and vacuum may be adjusted again to facilitate the removal of all volatiles in the third step.

As described above, the method of embodiments may occur in three distinct steps, the third step being optional. However, the reaction may be conducted in a continuous manner in a single reaction vessel in a one-pot method. For example, in embodiments wherein the block copolycarbonate/phosphonates of embodiments are produced on a large scale, the first step of the reaction may be conducted in a batch reactor with mechanical stirring, and the second step may be conducted in a continuous reactor in which high shear stirring may be used to spread the reaction mixture into a thin layer on the side walls of the reactor to provide a large surface area which may enhance the removal of volatiles.

Without wishing to be bound by theory, the molecular architecture (i.e. block copolymer) of the block copolycarbonate/phosphonates produced using methods described herein may explain differences in properties as compared to random copolymers described in the prior art. However, it is not obvious that this molecular architecture would result from the instant method, nor is it obvious that this molecular architecture would give rise to the observed combination of physical and mechanical properties possessed by the compositions produced by the instant method.

The block copolycarbonate/phosphonates prepared using the methods presented herein may be used to produce polymer mixtures or blends with commodity and engineering plastics, and may impart to these polymer mixtures or blends the advantageous characteristics described above. The term "polymer mixtures or blends", as used herein, may refer to a composition having at least one block copolycarbonate/phosphonate prepared using the methods described above and at least one other polymer. There term "other polymer", as used herein, refers to any polymer other than the block copolycarbonate/phosphonate composition of the present invention. These other polymers may be commodity or engineering plastics such as polycarbonate, polyacrylate, polyacrylonitrile, saturated or unsaturated polyester, polyamide, polystyrene (including high impact strength polystyrene), polyurea, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, cellulose polymer, or any combination thereof (commercially available from, for example, GE Plastics, Pittsfield, Mass.; Robin & Has Co., Philadelphia, Pa.; Bayer Corp.—Polymers, Akron, Ohio; Reichold;

DuPont; Huntsman LLC, West Deptford, N.J.; BASF Corp., Mount Olive, N.J.; Dow Chemical Co., Midland, Mich.; ExxonMobil Chemical Corp., Houston, Tex.; ExxonMobil; Mobay Chemical Corp., Kansas City, Kans.; Goodyear Chemical, Akron, Ohio; BASF Corp.; 3M Corp., St, Paul, Minn.; Solutia, Inc., St. Louis, Mo.; and Eastman Chemical Co., Kingsport, Tenn., respectively). The polymer mixtures or blends may be produced via blending, mixing, or compounding the constituent materials.

The block copolycarbonate/phosphonates or the polymer mixtures or blends described herein may also contain other components, such as fillers, surfactants, organic binders, polymeric binders, crosslinking agents, coupling agents, anti-dripping agents, heat stabilizers, antioxidants, colorants, inks, dyes, or any combination thereof.

The block copolycarbonate/phosphonate compositions or the polymer mixtures or blends of embodiments presented herein, may generally be self-extinguishing in that they quickly stop burning when removed from a flame. In addition, drops produced by melting these block copolycarbonate/phosphonate compositions or the polymer mixtures or blends in a flame quickly stop burning and typically do not propagate fire to surrounding materials. Moreover, these block copolycarbonate/phosphonate compositions or the polymer mixtures or blends usually may not evolve any noticeable smoke when a flame is applied.

The block copolycarbonate/phosphonate compositions or the polymer mixtures or blends of embodiments can be used as coatings or can be used to fabricate articles, such as, free-standing films, fibers, foams, molded articles, adhesives and fiber reinforced composites. These articles may be well-suited for applications requiring tire resistance.

In summary, the block copolycarbonate/phosphonate compositions and the block copolycarbonate/phosphonate polymer mixtures exhibit outstanding flame resistance and an advantageous combination of properties such as high heat distortion temperatures, low color, high toughness, hydrolytical stability, and Tgs. Relative to the state-of-the-art random copolycarbonate/phosphonates, the block copolycarbonate/phosphonates exhibit equivalent flame resistance, but have noticeably improved toughness and higher Tgs. Such improvements make these materials useful in applications in the automotive and electronic sectors that require outstanding tire resistance, high temperature performance, low color, and melt processability.

This invention and embodiments illustrating the method and materials used may be further understood by reference to the following non-limiting examples.

Example 1

State-of-the-Art Comparative Example

Random Copolycarbonate/Phosphonates

This state-of-the-art comparative example was prepared following the procedure described in U.S. Pat. No. 4,322,520.

Into a 250 mL three neck round bottom flask equipped with a distillation column and mechanical stirrer was placed 2,2-bis(4-hydroxyphenyl) propane (bisphenol A, 32.2 g, 0.167 mole), methylphosphonic acid diphenyl ester (96% purity, 4% phenol) (12.41 g, 0.048 mole), diphenylcarbonate (29.65 g, 0.139 mole) and 5 mg of sodium phenolate catalyst. The mixture was heated to 250° C. under vacuum. The temperature was gradually increased to 300° C. over a 6 hour period. As the temperature was increased the vacuum was decreased from about 200 mm to about 1.5 mm Hg. During this time 36.30 g of distillate was collected. The column was removed from the flask and the mixture heated to 300° C. under 1.5 mm Hg for 5 hours. Distillate (1.9 g) was also collected during this step. The yellow solid (38.62 g) exhibited a relative viscosity of 1.18 and a Tg of 126° C. The percentage of phosphorous in this polymer was 3.16%.

A film was cast from methylene chloride and subsequently dried. The film was light yellow in color. A qualitative tear test conducted on the film indicated that it was relatively brittle. Qualitative flame testing of the film indicated that it had good self-extinguishing characteristics.

Example 2

Synthesis of a Block Copolycarbonate/Phosphonate

Into a 250 mL three neck round bottom flask equipped with a distillation column and mechanical stirrer was placed the 2,2-bis(4-hydroxyphenyl)propane (bisphenol A, 53.70 g, 0.236 mole) diphenylcarbonate (33.70 g, 0.158 mole) and 8 mg of sodium phenolate (NaOPh) catalyst. The mixture was heated to 250° C. under vacuum (150-200 mm Hg) for about 1.5 hours. The mixture was subsequently allowed to cool and methylphosphonic acid diphenyl ester (23.4 g, 0.094 mole) and 12 mg of tetraphenylphosphonium phenolate (TPPOP) catalyst which is a chemical complex of tetraphenylphosphonium phenolate and phenol consisting of about 70% and about 30% of each, respectively (m.p. 145° C.) were added. The mixture was heated from 250 to 300° C. while reducing the pressure from 150 to 1.5 mm Hg over about a 4.5 to 5 hour period. A noticeable, rapid increase in solution viscosity of the melt was observed over the last hour of the reaction.

Approximately 53 g of distillate was collected over the course of the reaction. The pale yellow, tough polymer exhibited a $\eta_{rel}$=1.30 and a Tg of 133° C. The percentage phosphorous in this polymer was 3.49%.

A film was cast from methylene chloride and subsequently dried. The film was light yellow in color. A qualitative tear test was conducted on the film. In comparison to the film prepared from the state-of-the-art random copolycarbonate/phosphonates example, this film was significantly tougher. In addition, the film from this method exhibited a significantly higher Tg (133° C.) than the state-of-the-art random copolycarbonate/phosphonate film (126° C.) of the comparative method. Qualitative flame testing of the film indicated that it had excellent self-extinguishing characteristics and was comparable to that of the state-of-the-art random copolycarbonate/phosphonate film.

Example 3

Synthesis of a Block Copolycarbonate/Phosphonate

Into a 250 mL three neck round bottom flask equipped with a distillation column and mechanical stirrer was placed the 2,2-bis(4-hydroxyphenyl)propane (bisphenol A, 53.70 g, 0.236 mole) diphenylcarbonate (33.70 g, 0.158 mole) and 12 mg of tetraphenylphosphonium phenolate (TPPOP) catalyst. The mixture was heated to 250° C. under vacuum (150-200 mm Hg) for about 1.5 hours. Approximately 20 g of distillate was collected during this step. The mixture was subsequently allowed to cool and methylphosphonic acid diphenyl ester (23.4 g, 0.094 mole) and 12 mg of TPPOP catalyst which is a chemical complex of tetraphenylphosphonium phenolate and phenol consisting of about 70% and about 30% of each, respectively (m.p. 145° C.) were added. The mixture was heated from 250 to 300° C. while reducing the pressure from 150 to 1.5 mm Hg over about a 5 to 5.5 hour period. Approximately 28 g of distillate was collected during this step.

The distillation column was subsequently removed from the flask and 12 mg of TPPOP catalyst was added. The mixture was heated to 300° C. under full vacuum (approximately 0.1 mm Hg) for approximately 1 hour. A noticeable, rapid increase in solution viscosity of the melt was observed over the last 0.5 to 0.75 hour of the reaction.

Approximately 3.8 g of distillate was collected during this step of the reaction. The pale yellow, tough polymer exhibited a $\eta_{rel}$=1.23 and as Tg of 131° C.

In an attempt to ensure that all volatiles had been removed, approximately 38 g of the block copolycarbonate/phosphonate and 12 mg of TPPOP catalyst were placed into the 250 mL three neck round bottom flask equipped with a mechanical stirrer. The mixture was heated to 300° C. under full vacuum for about 1 hour. Approximately 0.3 g of distillate was collected during this step. The pale yellow, tough polymer exhibited a $\eta_{rel}$=1.31 and a Tg of 134° C.

A film was cast from methylene chloride and subsequently dried. The film was light yellow in color. A qualitative tear test was conducted on the film. In comparison to the film prepared from the state-of-the-art random copolycarbonate/phosphonates example, this film was significantly tougher. In addition, the film from this method exhibited a significantly higher Tg (134° C.) than the state-of-the-art random copolycarbonate/phosphonate film (126° C.) of the comparative method. Qualitative flame testing of the film indicated that it had excellent self-extinguishing characteristics and was comparable to that of the state-of-the-art random copolycarbonate/phosphonate film.

Example 4

Synthesis of a Block Copolycarbonate/Phosphonate

Into a 250 mL three neck round bottom flask equipped with a distillation column and mechanical stirrer was placed the 2,2-bis(4-hydroxyphenyl)propane (bisphenol A, 53.70 g, 0.236 mole) diphenylcarbonate (33.70 g, 0.158 mole) and 8 mg of sodium phenolate (TPPOP) catalyst. The mixture was heated to 250° C. under vacuum (150-200 mm Hg) for about 1.5 hours. Approximately 21 g of distillate was collected during this step. At this stage the block copolycarbonate/phosphonate exhibited a $\eta_{rel}$=1.02.

The mixture was subsequently allowed to cool and methylphosphonic acid diphenyl ester (23.4 g, 0.094 mole) and 12 mg of TPPOP catalyst which is a chemical complex of tetraphenylphosphonium phenolate and phenol consisting of about 70% and about 30% of each, respectively (m.p. 145° C.) were added. The mixture was heated from 250 to 300° C. while reducing the pressure from 150 to 1.5 mm Hg over about a 5 hour period. The mixture was allowed to cool to room temperature overnight. The solution was subsequently heated to 300° C. under full vacuum for about 1 to 1.5 hours. Approximately 29 g of distillate was collected during this step. The pale yellow, tough polymer exhibited a $\eta_{rel}$=1.21 and a Tg of 132° C.

In an attempt to ensure that all volatiles had been removed, approximately 50 g of the block copolycarbonate/phosphonate and 12 mg of TPPOP catalyst were placed into the 250 mL three neck round bottom flask equipped with a mechanical stirrer. The mixture was heated to 300° C. under full vacuum for about 2 hours. Approximately 0.4 g of distillate was collected during this step. The pale yellow, tough polymer exhibited a $\eta_{rel}$=1.28 and a Tg of 135° C.

A film was cast from methylene chloride and subsequently dried. The film was light yellow in color. A qualitative tear test was conducted on the film. In comparison to the film prepared from the state-of-the-art random copolycarbonate/phosphonates example, this film was significantly tougher. In addition, the film from this method exhibited a significantly higher Tg (135° C.) than the state-of-the-art random copolycarbonate/phosphonate film (126° C.) of the comparative method. Qualitative flame testing of the film indicated that it had excellent self-extinguishing characteristics and was comparable to that of the state-of-the-art random copolycarbonate/phosphonate film.

Example 5

Synthesis of a Block Copolycarbonate/Phosphonate

Into a 250 mL three neck round bottom flask equipped with a distillation column and mechanical stirrer was placed the 2,2-bis(4-hydroxyphenyl)propane (bisphenol A, 53.70 g, 0.236 mole) diphenylcarbonate (33.70 g, 0.158 mole) and 8 mg of sodium phenolate (TPPOP) catalyst. The mixture was heated to 250° C. under vacuum (150-200 mm Hg) for about 1.5 hours. Approximately 21.5 g of distillate was collected during this step. At this stage the block copolycarbonate/phosphonate exhibited a $\eta_{rel}$=1.04.

The mixture was subsequently allowed to cool and methylphosphonic acid diphenyl ester (23.4 g, 0.094 mole) and 12 mg of TPPOP catalyst which is a chemical complex of tetraphenylphosphonium phenolate and phenol consisting of about 70% and about 30% of each, respectively (m.p. 145° C.) were added. The mixture was heated from 250 to 300° C. while reducing the pressure from 150 to 1.5 mm Hg over about a 4.5 to 5 hour period. A noticeable, rapid increase in solution viscosity of the melt was observed over the last hour of the reaction. Approximately 27.2 g of distillate was collected during this step. The pale yellow, tough polymer exhibited a $\eta_{rel}$=1.26 and a Tg of 134° C.

A film was east from methylene chloride and subsequently dried. The film was light yellow in color. A qualitative tear test was conducted on the film. In comparison to the film prepared from the state-of-the-art random copolycarbonate/phosphonates example, this film was significantly tougher. In addition, the film from this method exhibited a significantly higher Tg (134° C.) than the state-of-the-art random copolycarbonate/phosphonate film (126° C.) of the comparative method. Qualitative flame testing of the film indicated that it had excellent self-extinguishing characteristics and was comparable to that of the state-of-the-art random copolycarbonate/phosphonate film.

Example 6

Synthesis of a Block Copolycarbonate/Phosphonate

Into a 250 mL three neck round bottom flask equipped with a distillation column and mechanical stirrer was placed the 2,2-bis(4-hydroxyphenyl)propane (bisphenol A, 53.70 g, 0.236 mole) diphenylcarbonate (33.70 g, 0.158 mole) and 8 mg of sodium phenolate (TPPOP) catalyst. The mixture was heated to 250° C. under vacuum (150-200 mm Hg) for about 2 hours. Approximately 23.2 g of distillate was collected during this step. At this stage the block copolycarbonate/phosphonate exhibited a $\eta_{rel}$=1.04.

The mixture was subsequently allowed to cool and methylphosphonic acid diphenyl ester (23.4 g, 0.094 mole) and 12 mg, of TPPOP catalyst which is a chemical complex of tetraphenylphosphonium phenolate and phenol consisting of about 70% and about 30% of each, respectively (m.p. 145° C.) were added. The mixture was heated from 250 to 300° C. while reducing the pressure from 150 to 1.5 mm Hg over about a 5 hour period. A noticeable, rapid increase in solution viscosity of the melt was observed over the last hour of the reaction. Approximately 29.6 g of distillate was collected during this step. The pale yellow, very tough polymer exhibited a Tg of 132° C.

Example 7

Synthesis of a Block Copolycarbonate/Phosphonate

Into a 250 mL three neck round bottom flask equipped with a distillation column and mechanical stirrer was placed the polycarbonate (Makrolon 3103, $\eta_{rel}$=1.29-1.30) (25.4 g, 0.10 mole), methylphosphonic acid diphenyl ester (95% purity, 5% phenol) (26.1 g, 0.10 mole), phenol (18.8 g, 0.20 mole) and 12 mg of tetraphenylphosphonium phenolate (TPPOP) catalyst which is a chemical complex of tetraphenylphosphonium phenolate and phenol consisting of about 70% and about 30% of each, respectively (m.p. 145° C.). The mixture was heated wider vacuum (about 500 mm Hg) at 240° C. for 3 hours. During this first step, the phenol was refluxing, but not being distilled from the reaction vessel. In the second step, the temperature was increased to 300° C. and the pressure was reduced to about 1.5 mm Hg for a period of 6 hours. During this lime a significant amount of distillate was collected. In the third step, the distillation column was removed and an additional 12 mg of TPPOP was added. The reaction mixture was heated to 300° C. under 0.1 mm Hg for 5 hours.

During the course of the entire reaction 38.4 g of distillate was collected. The amount of light brownish product obtained was 24.5 g. The material exhibited a $\eta_{rel}$=1.18 and a Tg of 126° C. The amount of phosphorus in the copolymer was 2.85% by weight.

In order to determine if volatile removal was complete, the third step was repeated as follows; the product (23 g) and TPPOP (12 mg) were placed in a 100 mL three neck flask equipped with as distillation column and mechanical stirrer. The mixture was heated to 300° C. under 0.1 mm Hg for 5 hours. Additional distillate (2.21 g) was collected, and the product (18.5 g) was slightly brownish and noticeably tougher. The copolymer exhibited a $\eta_{rel}$=1.30 and a Tg of 134° C. The amount of phosphorus in the copolymer was 3.07% by weight.

A film was cast from methylene chloride and subsequently dried. The film was light yellow in color. A qualitative tear test was conducted on the film. In comparison to the film prepared from the state-of-the-art random copolycarbonate/phosphonates example, this film was noticeably tougher. In addition, the film from this method exhibited a significantly higher Tg (134° C.) than the state-of-the-art random copolycarbonate/phosphonate film (126° C.) from the comparative method. Qualitative flame testing of the film indicated that it had excellent self-extinguishing characteristics and was comparable to that of the state-of-the-art random copolycarbonate/phosphonate film.

Example 8

Synthesis of a Block Copolycarbonate/Phosphonate

Into a 250 mL three neck round bottom flask equipped with a distillation column and mechanical stirrer was placed the polycarbonate (Makrolon 3103, $\eta_{rel}$=1.29-1.30) (50.8 g, 0.20 mole), methylphosphonic acid diphenyl ester (94% purity, 6% phenol) (13.19 g, 0.05 mole), phenol (9.4 g, 0.10 mole) and 12 mg of tetraphenylphosphonium phenolate (TPPOP) catalyst which is a chemical complex of tetraphenylphosphonium phenolate and phenol consisting of about 70% and about 30% of each, respectively (m.p. 145° C.). The mixture was heated under vacuum (about 500 mm Hg) at 240° C. for 3 hours. During this first step, the phenol was refluxing, but not being distilled from the reaction vessel. In the second step, the temperature was increased to 300° C. and the pressure was reduced to about 1.5 mm Hg for a period of 6 hours. During this time a significant amount of distillate was collected (20.27 g). In the third step, the distillation column was subsequently removed and an additional 12 mg of TPPOP was added. The reaction mixture was heated to 300° C. under 0.1 mm Hg for 5 hours. An additional 0.33 g of distillate was collected during this second heating step. The product was light brownish and tough. The copolymer exhibited a $\eta_{rel}$=1.21 and a Tg of 134° C. The amount of phosphorus in the copolymer was 1.09% by weight.

A film was east from methylene chloride and subsequently dried. The film was light yellow in color. A qualitative tear test was conducted on the film. In comparison to the film prepared from the state-of-the-art random copolycarbonate/phosphonates example, this film was noticeably rougher. In addition, the film from this method exhibited a significantly higher Tg (134° C.) than the state-of-the-art random copolycarbonate/phosphonate film (126° C.) of the comparative method. Qualitative flame testing of the film indicated that it had excellent self-extinguishing characteristics and was comparable to that of the state-of-the-art random copolycarbonate/phosphonate film.

Example 9

Synthesis of a Block Copolycarbonate/Phosphonate

Into a 250 mL three neck round bottom flask equipped with a distillation column and mechanical stirrer was placed the polycarbonate (Makrolon 3103, $\eta_{rel}$=1.29-1.30) (38.1 g, 0.15 mole), methylphosphonic acid diphenyl ester (94% purity, 6% phenol) (19.82 g, 0.075 mole), phenol (14.1 g, 0.15 mole) and 12 mg of tetraphenylphosphonium phenolate (TPPOP) catalyst which is a chemical complex of tetraphenylphosphonium phenolate and phenol consisting of about 70% and about 30% of each, respectively (m.p. 145° C.). The mixture was heated under vacuum (about 500 mm Hg) at 240° C. for 3 hours. During this first step, the phenol was refluxing, but not being distilled from the reaction vessel. In the second step, the temperature was increased to 300° C. and the pressure was reduced to about 1.5 mm Hg for a period of 6 hours. During this time a significant amount of distillate was collected (31.23 g). In the third step, the distillation column was subsequently removed and an additional 12 mg of TPPOP was added. The reaction mixture was heated to 300° C. under 0.1 mm Hg for 5 hours and an additional 2.56 g of distillate was collected. The product was light brownish and tough. The copolymer exhibited a $\eta_{rel}$=1.21 and a Tg of 136° C. The amount of phosphorus in the copolymer was 1.59% by weight.

A film was cast from methylene chloride and subsequently dried. The film was light yellow in color. A qualitative tear test was conducted on the film. In comparison to the film prepared from the state-of-the-art random copolycarbonate/phosphonates example, this film was noticeably tougher. In addition, the film from this method exhibited a significantly higher Tg (136° C.) than the state-of-the-art random copolycarbonate/ phosphonate film (126° C.) of the comparative method. Qualitative flame testing of the film indicated that it had excellent self-extinguishing characteristics and was comparable to that of the state-of-the-art random copolycarbonate/phosphonate film.

Example 10

Synthesis of a Block Copolycarbonate/Phosphonate

Into 12 L reactor equipped with a distillation column and mechanical stirrer was placed the 2,2-bis-(4-hydroxyphenyl)propane (bisphenol A, 4.028 kg, 17.67 mol), Diphenyl carbonate (818 g, 3.82 mol and 600 mg Sodium phenolate (NaOPh) catalyst. The mixture was heated to 250° C. under vacuum (150-200 mmHg) for about 1.5 hours. The mixture was subsequently allowed to cool and methylphosphonic acid diphenyl ester (3697 g, 14.91 mol) and 900 mg Tetraphenylphosphonium phenolate (TPPOP) catalyst which is a chemical complex of tetraphenylphosphonium phenolate and phenol consisting of about 70% and about 30% of each, respectively (m.p 145° C.) were added. The mixture was heated from 250 to 300° C. while reducing the pressure from 150 to 1.5 mm Hg over about 16 to 16.5 hours period. A noticeable, rapid increase in solution viscosity of the melt was observed over the last hour of the reaction.

Approximately 3465.7 g of distillate was collected over the course of the reaction. The pale yellow, tough polymer exhibited a $\eta_{rel}$=1.35 and a Tg of 109° C. The percentage of phosphorous in this polymer was 8.09%.

Example 11

Synthesis of a Block Copolycarbonate/Phosphonate

Into 12 L reactor equipped with a distillation column and mechanical stirrer was placed the 2,2-bis-(4-hydroxyphenyl)propane (bisphenol A, 4.028 kg, 17.67 mol), Diphenyl carbonate (2812 g, 13.14 mol) and 600 mg Sodium phenolate (NaOPh) catalyst. The mixture was heated to 250° C. under vacuum (150-200 mmHg) for about 1.5 hours. The mixture was subsequently allowed to cool and methylphosphonic acid diphenyl ester (1396 g, 5.63 mol) and 900 mg Tetraphenylphosphonium phenolate (TPPOP) catalyst which is a chemical complex of tetraphenylphosphonium phenolate and phenol consisting of about 70% and about 30% of each, respectively (m.p 145° C.) were added. The mixture was heated from 250 to 300° C. while reducing the pressure from 150 to 1.5 mm Hg over about 9 hours period. A noticeable, rapid increase in solution viscosity of the melt was observed over the last hour of the reaction.

Approximately 3656 g of distillate was collected over the course of the reaction. The pale yellow, tough polymer exhibited a ηrel=1.25 and a Tg of 129° C. The percentage of phosphorous in this polymer was 3.57%.

Although the present invention has been described in considerable detail with reference to certain preferred embodiments thereof, other versions are possible. Therefore the spirit and scope of the appended claims should not be limited to the description and the preferred versions contained within this specification.

The invention claimed is:

1. A method of preparing block copolycarbonate/phosphonates comprising;
    obtaining a predominately phenol terminated oligocarbonate, and free bisphenol, in a first step; and
    reacting the predominately phenol terminated oligocarbonate, and free bisphenol, with an alkylphosphonic acid diarylester at a temperature of from about 200° C. to about 310° C. under reduced pressure in a melt to make a hydrolytically stable, block copolycarbonate/phosphonate in a second step.

2. The method of claim 1, wherein the elevated temperature and reduced pressure of the second step are such that volatile components are removed.

3. The method of claim 1, wherein the method further comprises reacting a polycarbonate with a phenolic compound under conditions such that the phenolic compound is refluxing but is not removed to obtain the predominately phenol terminated oligocarbonate, and free bisphenol.

4. The method of claim 3, wherein the phenolic compound is phenol.

5. The method of claim 3, wherein the step of reacting the polycarbonate with the phenolic compound occurs in the presence of the alkylphosphonic acid diarylester.

6. The method of claim 3, wherein the phenolic compound is provided at a molar ratio of about 0.1 to about 5 of the polycarbonate.

7. The method of claim 1, wherein the method further comprises reacting diphenyl carbonate, a molar excess of a bisphenol, and a transesterification catalyst at elevated temperature under reduced pressure in a melt to obtain the predominately phenol terminated oligocarbonate, and free bisphenol.

8. The method of claim 7, wherein the bisphenol is 2,2-bis (4-hydroxyphenyl)propane.

9. The method of claim 1, wherein the alkylphosphonic acid diarylester is methylphosphonic acid diphenylester.

10. The method of claim 1, wherein the alkylphosphonic acid diarylester is provided at a molar ratio of from about 0.1 to about 5 of the predominately phenol terminated oligocarbonate.

11. The method of claim 1, further comprising providing a transesterification catalyst.

12. The method of claim 11, wherein the transesterification catalyst is selected from sodium phenolate, tetraphenylphosphonium phenolate, or combinations thereof.

13. The method of claim 11, wherein the transesterification catalyst is provided prior to the step of reacting.

14. The method of claim 11, further comprising providing transesterification catalyst during the step of reacting.

15. The method of claim 1, wherein the predominately phenol terminated oligocarbonate is selected from linear oligocarbonates, branched oligocarbonates, and combinations thereof.

16. The method of claim 1 wherein the predominately phenol terminated oligocarbonate has a relative viscosity $(\eta_{rel})$ of from about 1.02 to about 1.18.

17. The method of claim 1, wherein the elevated temperature and reduced pressure are maintained from about 0.5 to about 24 hours.

18. The method of claim 1, further comprising the step of heating a mixture resulting from the second step to a temperature of from about 250° C. to about 310° C. for from about 0.5 to about 10 hours.

19. The method of claim 1, wherein from about 0.1% to about 10% by weight phosphorous is present in the block copolycarbonate/phosphonate.

20. The method of claim 1, wherein from about 0.1 to about 5% by weight phosphorous is present in the block copolycarbonate/phosphonate.

21. A method for preparing block copolycarbonate/phosphonate comprising:

reacting a polycarbonate, a phenolic compound, and an alkylphosphonic acid diarylester in a first step under conditions such that the phenolic compound is refluxing but is not removed for a first time period; and reacting a mixture resulting from the first step at a temperature of from about 200° C. to about 310° C. under reduced pressure such that volatile compounds are removed for a second time period to make a hydrolytically stable, block copolycarbonate/phosphonate in a second step.

22. The method of claim 21, wherein oligocarbonates are formed in the first step.

23. The method of claim 21, wherein the phenolic compound is phenol.

24. The method of claim 21, wherein the alkylphosphonic acid diarylester is methylphosphonic acid diphenylester.

* * * * *